(12) United States Patent
Lichtinger

(10) Patent No.: US 6,739,857 B2
(45) Date of Patent: May 25, 2004

(54) ADJUSTABLE ROTARY DEVICE FOR A HORIZONTAL INJECTION MOLDING MACHINE

(75) Inventor: Peter Lichtinger, Fürstenfeldbruck (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 37 days.

(21) Appl. No.: 10/279,237

(22) Filed: Oct. 24, 2002

(65) Prior Publication Data
US 2003/0082270 A1 May 1, 2003

(30) Foreign Application Priority Data
Oct. 25, 2001 (DE) .......................... 101 52 625

(51) Int. Cl.[7] .......................... B29C 45/06; B29C 45/10
(52) U.S. Cl. .................... 425/127; 425/129.1; 425/572; 425/576; 425/255
(58) Field of Search .............................. 425/127, 129.1, 425/572, 574, 576, 450.1, 451, 453; 264/255, 297.2, 297.3, 297.4, 297.7

(56) References Cited

U.S. PATENT DOCUMENTS

| 1,571,557 | A | | 2/1926 | William | |
|---|---|---|---|---|---|
| 2,860,015 | A | | 11/1958 | Dunsforth | |
| 3,339,231 | A | * | 9/1967 | Tadeusz | 425/533 |
| 3,412,186 | A | * | 11/1968 | Tadeusz | 425/533 |
| 4,077,759 | A | * | 3/1978 | Saumsiegle et al. | 425/451 |
| 4,128,374 | A | * | 12/1978 | Saumsiegle et al. | 425/450.1 |
| 5,372,495 | A | * | 12/1994 | Ogura et al. | 425/526 |
| 5,409,656 | A | | 4/1995 | Naruse | |
| 6,024,558 | A | * | 2/2000 | Looije et al. | 425/576 |
| 6,402,504 | B1 | * | 6/2002 | Hahn et al. | 425/576 |

FOREIGN PATENT DOCUMENTS

| DE | 19 42 259 A | 3/1971 |
|---|---|---|
| DE | 21 32 432 A | 1/1973 |
| DE | 31 40 711 A | 4/1983 |
| EP | 0 743 156 A | 11/1996 |
| GB | 1 437 392 A | 5/1976 |
| JP | 62 060618 A | 3/1987 |
| WO | WO 01/10624 | 2/2001 |

* cited by examiner

Primary Examiner—Tim Heitbrink
(74) Attorney, Agent, or Firm—Henry M. Feiereisen

(57) ABSTRACT

A rotary device for a horizontal injection molding machine is disposed between a movable mold mounting plate and a fixed mold mounting plate of the injection molding machine and includes a base plate and a turntable, which is supported on the base plate for rotation about a vertical rotation axis and supports a swivel plate for interaction with the moveable and fixed mold mounting plates. The rotary device further includes an eccentric structure for displacement of the turnable in horizontal direction to thereby enable a precise position of the swivel plate between the moveable and fixed mold mounting plates.

8 Claims, 3 Drawing Sheets

ADJUSTABLE ROTARY DEVICE FOR A HORIZONTAL INJECTION MOLDING MACHINE

CROSS-REFERENCES TO RELATED APPLICATIONS

This application claims the priority of German Patent Application, Serial No. 101 52 625.3, filed Oct. 25, 2001, pursuant to 35 U.S.C. 119(a)–(d), the disclosure of which is incorporated herein by reference.

BACKGROUND OF THE INVENTION

The present invention relates, in general, to an adjustable rotary device for a horizontal injection machine for turning mold halves or molded articles between the mold mounting plates about a vertical axis. The invention also relates to an injection mold machine equipped with such a rotary device.

A rotary device of this type is described, for example, in International patent application no. WO 01/10624 A1 and includes a base plate and a turntable rotatably mounted on the base plate. The base plate with the attached turntable are mounted on a machine bed of a horizontal injection molding machine and can travel in axial direction between a moveable mold mounting plate and a fixed mold mounting plate. The turntable carries in operation a third mold plate, a so called swivel plate with mold halves, for interaction with respective mold halves of the moving and fixed mold mounting plates. A reliable operation of the injection molding machine with swivel plate requires a precise positioning of the swivel plate with respect to the fixed and moveable mold mounting plates. As a consequence of manufacturing tolerances, this demand cannot be met to a sufficient degree.

It would therefore be desirable and advantageous to provide an improved rotary device for horizontal injection molding machines, obviating prior art shortcomings.

SUMMARY OF THE INVENTION

According to one aspect of the present invention, a rotary device for a horizontal injection molding machine includes a base plate, a turntable supported on the base plate for rotation about a vertical rotation axis, and an eccentric structure for displacement of the turntable in horizontal direction.

The present invention resolves prior art problems by providing an adjusting capability for the turntable with respect to the vertical rotation axis.

According to another feature of the present invention, the eccentric structure may be composed of two interlocking eccentric rings, whereby the rotation axis of the turntable extends through the interior of the eccentric rings. Suitably, one of the eccentric rings is rotatably arranged with respect to the other eccentric ring.

According to another feature of the present invention, the base plate may include a bearing member for supporting the turntable, and a shifting plate, with the eccentric structure disposed between the bearing member and the shifting plate.

At operation, the position of the turntable and thus of the swivel plate which is mounted on the turntable is surveyed with respect to the fixed and moveable mold mounting plates, and subsequently the eccentric structure is adjusted by a suitable tool so that the vertical rotation axis of turntable is shifted until the swivel plate reaches a desired position.

According to another aspect of the present invention, a horizontal injection molding machine, includes a machine bed, a first mold mounting plate fixedly secured onto the machine bed and carrying a mold half, a second mold mounting plate adapted for traveling relative to the first mold mounting plate and carrying a mold half, and a rotary device arranged between the first and second mold mounting plates and including a base plate, a turntable supported on the base plate for rotation about a vertical rotation axis, and an eccentric structure for displacement of the turntable in horizontal direction.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
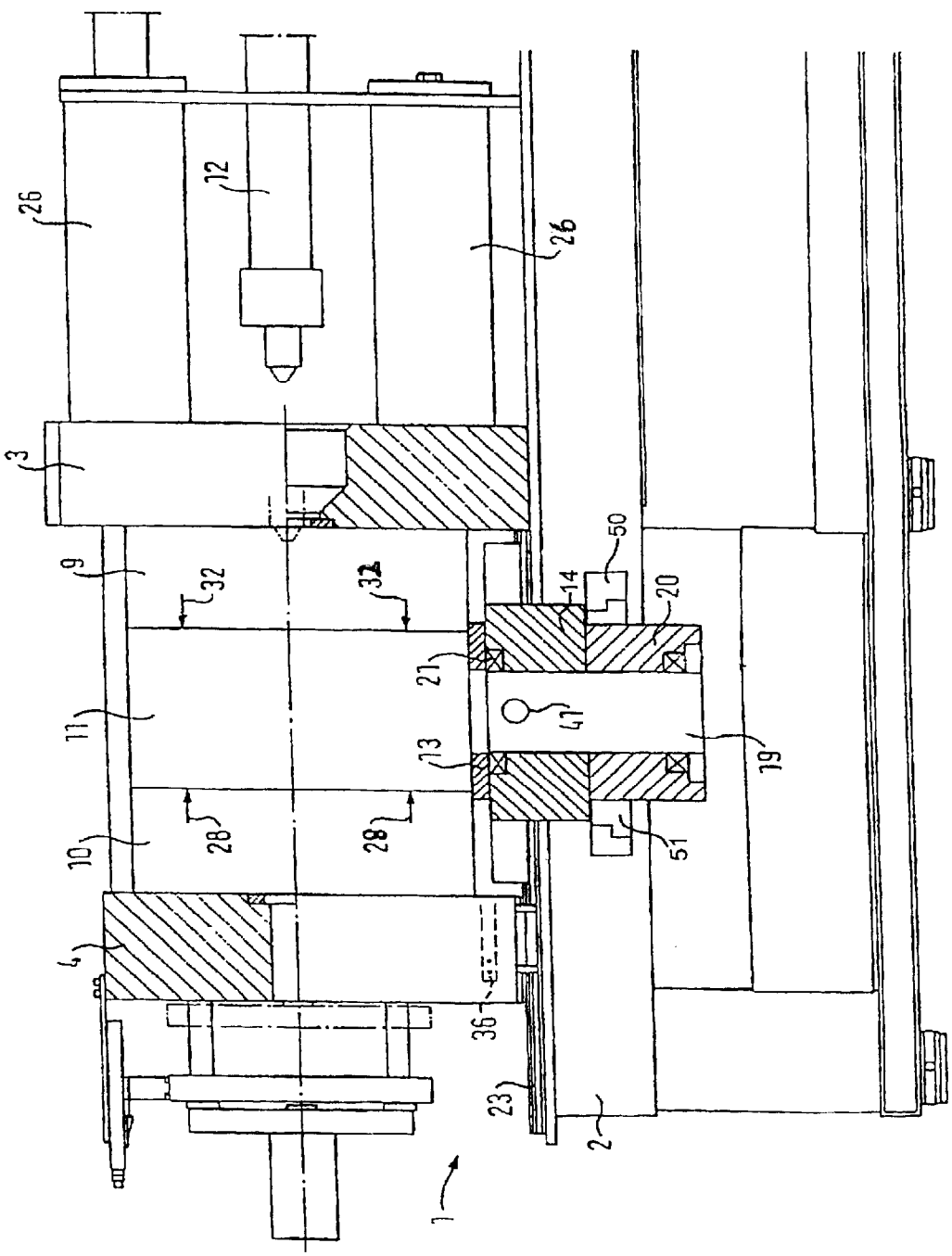
FIG. 1 is a partially sectional principal side view of an injection molding machine according to the present invention, equipped with a novel and inventive rotary device.

Throughout all the Figures, same or corresponding elements are generally indicated by same reference numerals.

Turning now to the drawing, and in particular to FIG. 1, there is shown a partially sectional principal side view of an injection molding machine according to the present invention, generally designated by reference numeral 1 and having a machine bed 2 for support of a mold with a fixed mold mounting plate 3, which carries a mold half 9, and a moving mold mounting plate 4, which carries a displaceable mold half 10. The moving mold mounting plate 4 is guided on a machine bed and pulled by tie bars relative to the stationary mold mounting plate 3. Hydraulic cylinders 26 are shown for movement of the tie bars (only two hydraulic cylinders 26 of four hydraulic cylinders are shown). Placed between the mold halves 9, 10 is a swivel plate 11. The swivel plate 11 and the mold halves 9, 10 are each provided with, not shown, form recesses in confronting relationship to define respective cavities. The fixed mold half 9 and the confronting side of the swivel plate 11 define the first phase of the molding process, whereas the second phase of the molding process is defined by the moving mold half 10 and the confronting side of the swivel plate 11. Injection of material in the first phase is implemented by an injection unit 12 associated to the fixed mold half 9, whereas the second phase injection is realized by a, not shown, injection unit which is attached to the moving mold half 10.

The swivel plate 11 is secured on a rotary device according to the invention, including a generally rectangular rotary turntable 13 for attachment of the swivel plate 11. The rotary table 13 is rotatably supported on a base plate 14 via a needle bearing 21. A pivot pin 19 (rotor) points downwards from the turntable 13 and is rotatably supported in a respective stator 20 and the base plate 14. The turntable 13 is rotated on the machine bed 2 by a suitable drive mechanism, e.g. ring gear mounted to the turntable 13 and meshing with a pinion driven by a motor, e.g., hydraulic motor or electric motor.

The base plate 14 is supported on stable linear guides 23 (or on slideways) on the machine bed 2, with the machine bed 2 including stable linear rails or slideways for engagement of the complementary underside of the bass plate 14. Disposed between the swivel plate 11 and the mold half 9 in the first phase of the mold are at least two, preferably four, hydraulic release cylinders 28 in symmetric disposition, and disposed at the partition plane between the swivel plate 11 and the mold half 10 in the second phase of the mold are at least two, preferably four, hydraulic release cylinders 32 in symmetric disposition, as indicated by arrows. The release cylinders 28, 32 generate during opening movement a parallel, simultaneous short stroke as additional support for a parallel opening of the mold.

The movement of the rotary device in longitudinal direction of the machine bed 2 is implemented by a shifting mechanism comprised of racks or steep-threaded spindles 36 (only one is shown here), articulated on both sides to the mold mounting plates 9, 10, and gears 41 (only one is shown here) which are respectively attached to the base plate 14. Operation of such an injection molding machine is generally known and fully described in International patent application no. WO 01/10624 A1, the entire specification and drawings of which are expressly incorporated herein by reference.

As further shown symbolically in FIG. 1, the rotary device includes an eccentric structure comprised of an outer eccentric ring 50 and an inner eccentric ring 51, which are arranged in interlocking relationship, with the outer circumference of the eccentric ring 51 abutting against the inner circumference of the eccentric ring 50. A turning of one of the eccentric rings 50, 51 relative to the other one of the eccentric rings 50, 51 is translated in a displacement of the base plate 14 along a circular path as defined by the eccentric structure. Suitably, the circular path is so defined that the displacement of the base plate 14 is realized substantially transversely to the longitudinal axis of the injection molding machine, i.e. perpendicular to the drawing plane of FIG. 1.

Figure 2:
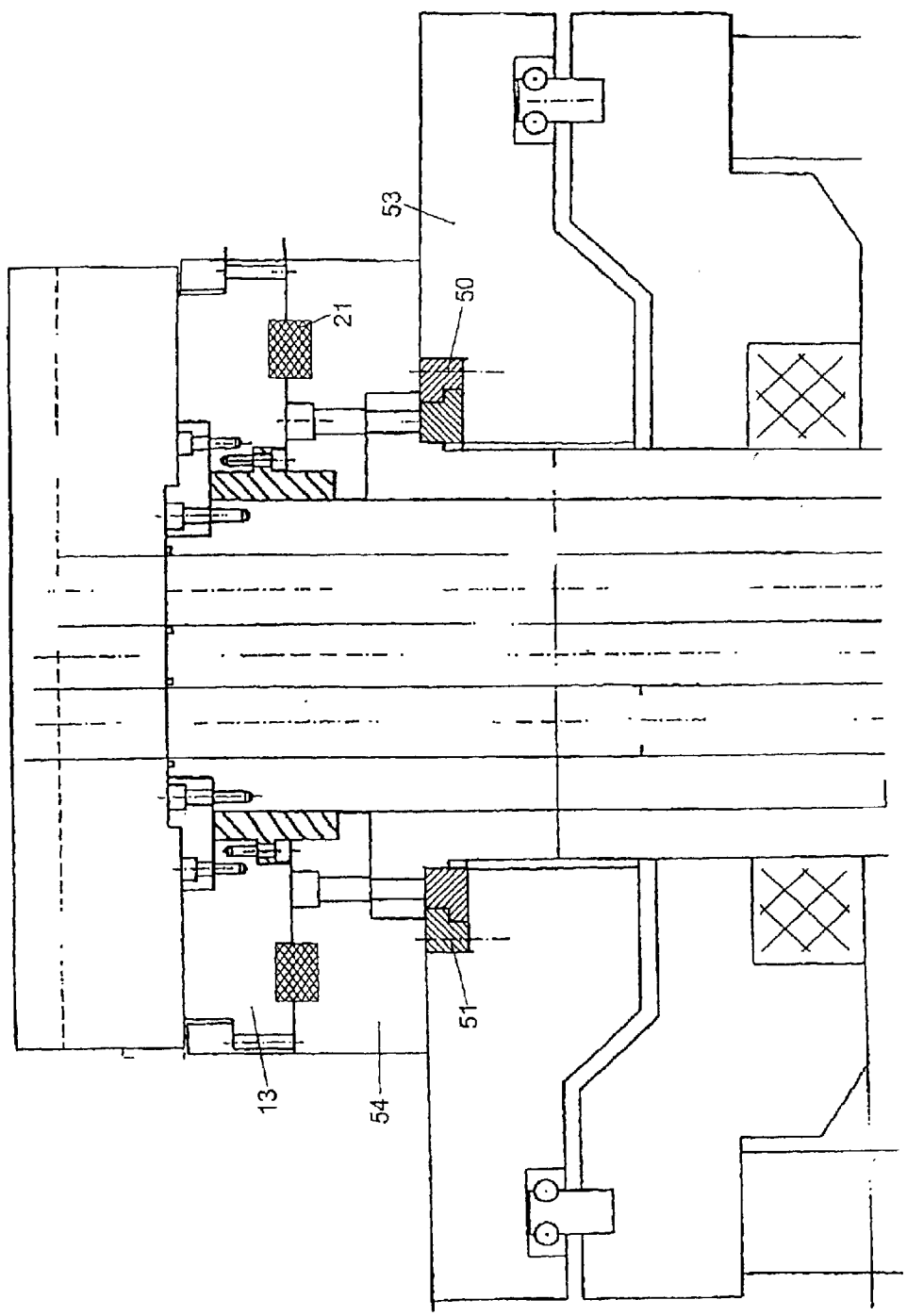
FIG. 2 is a detailed view of the rotary device with a base plate and eccentric structure.

Turning now to FIG. 2, there is shown a detailed view of the rotary device according to the present invention. The base plate 14 includes a bearing plate 54 and a shifting plate 53. The bearing plate 54 supports via the needle bearing 21 the turntable 13 and rests upon the shifting plate 53. Disposed between the bearing plate 54 and the shifting plate 53 are the eccentric rings 50, 51 of the eccentric structure. A turning of the eccentric rings 50, 51 relative to one another through application of a suitable tool results in a displacement of the bearing plate 54 in correspondence with the turning of the eccentric structure. As a result the base plate 14 and thus the turntable 13 are shifted to thereby adjust the swivel plate 11.

Figure 3:
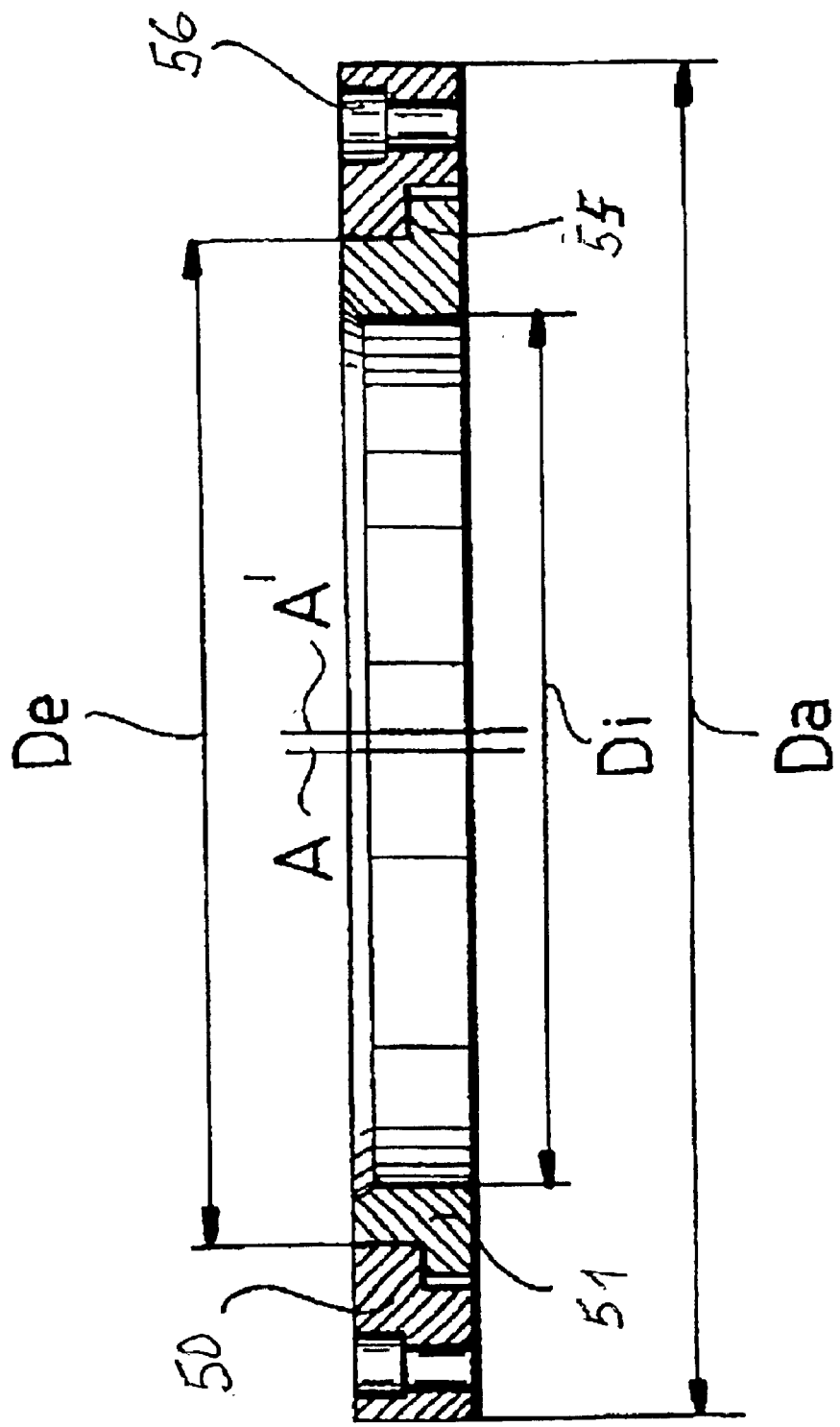
FIG. 3 is an axial section through the eccentric structure according to the present invention.

Referring now to FIG. 3, there is shown a detailed illustration of the eccentric structure comprised of the eccentric rings 50, 51 which have each a L-shaped configuration. The outer eccentric ring 50 has an outside diameter Da and an inside diameter De and the inner eccentric ring 51 has an outside diameter De and an inside diameter Di, with the outer eccentric ring 50 overreaching and holding the inner eccentric ring 51 at 55. The center of curvature of the circular outer periphery of the outer eccentric ring 50 lies on the axis A but the center of curvature of its circular inner periphery lies on an axis A' offset, laterally therefrom. The inner and outer peripheries of the inner eccentric ring 51 are coaxial. The outer eccentric ring 50 is formed with a plurality of arcuate slots 56 for receiving screws to secure the two eccentric rings 50, 51. Of course, it would be possible to make the inner eccentric ring eccentric and the outer eccentric ring coaxial. Either way, when one of the eccentric rings is rotated relative to the other, after, of course, loosening the bolts to allow such rotation, the base plate 14 and thus the turntable 13 are shifted to thereby adjust the swivel plate 11. Once the proper position is set, the bolts are tightened to lock in the setting. In this context, reference is also made to commonly assigned U.S. Pat. No. 5,688,537, issued on Nov. 18, 1997, the disclosure of which is incorporated herein by reference.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A horizontal injection molding machine having a rotary device, said device comprising, a base plate; a turntable supported on the base plate for rotation about a vertical rotation axis; and an eccentric structure for displacement of the turntable in a horizontal direction.

2. The horizontal injection molding machine of claim 1, wherein the eccentric structure is composed of two interlocking eccentric rings.

3. The horizontal injection molding machine of claim 2, wherein one of the eccentric rings is constructed for rotation relative to the other one of the eccentric rings.

4. The horizontal injection molding machine of claim 1, wherein the base plate includes a bearing member for supporting the turntable, and a shifting plate, with the eccentric structure disposed between the bearing member and the shifting plate.

5. A horizontal injection molding machine, comprising:

a machine bed;

a first mold mounting plate fixedly secured onto the machine bed and carrying a mold half;

a second mold mounting plate adapted for traveling relative to the first mold mounting plate and carrying a mold half; and a rotary device arranged between the first and second mold mounting plates and including a base plate, a turntable supported on the base plate for rotation about a vertical rotation axis, and an eccentric structure for displacement of the turntable in horizontal direction.

6. The injection molding machine of claim 5, wherein the eccentric structure is composed of two interlocking eccentric rings.

7. The injection molding machine of claim 6, wherein one of the eccentric rings is constructed for rotation relative to the other one of the eccentric rings.

8. The injection molding machine of claim 5, wherein the base plate includes a bearing member for supporting the turntable, and a shifting plate, with the eccentric structure disposed between the bearing member and the shifting plate.

\* \* \* \* \*